J. B. KING.
Making Chemicals.

No. 11,966. Patented Nov. 21, 1854.

WITNESSES.
Lemuel W. Serrell
Thomas C. Harold

INVENTOR
J. B. King

UNITED STATES PATENT OFFICE.

JEROME B. KING, OF NEW YORK, N. Y.

KETTLE FOR CALCINING PLASTER OF PARIS.

Specification of Letters Patent No. 11,966, dated November 21, 1854.

*To all whom it may concern:*

Be it known that I, JEROME B. KING, of the city, county, and State of New York, have invented, made, and applied to use a new and useful Improvement in Kettles for Calcining Plaster; and I do hereby declare that the following is a full, clear, and exact description of the same, reference being had to the annexed drawings, making part of this specification, wherein—

Figure 1:
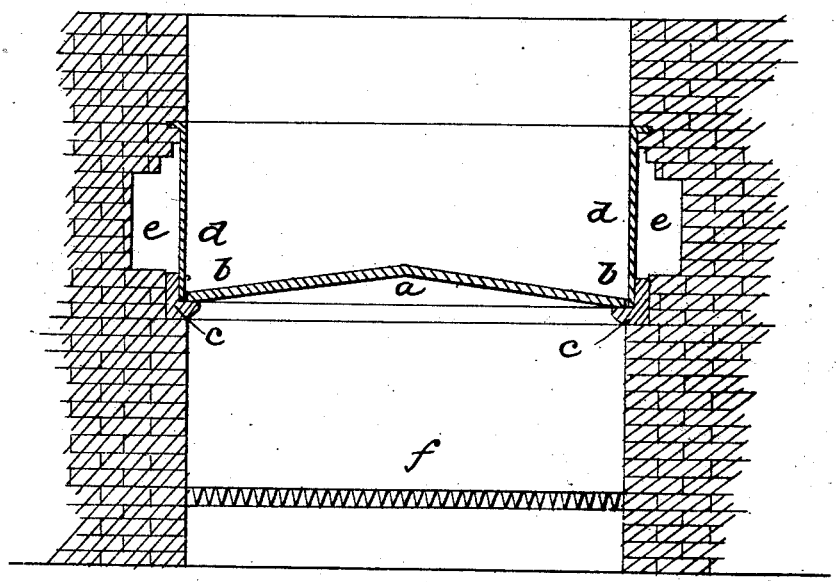
Figure 2:
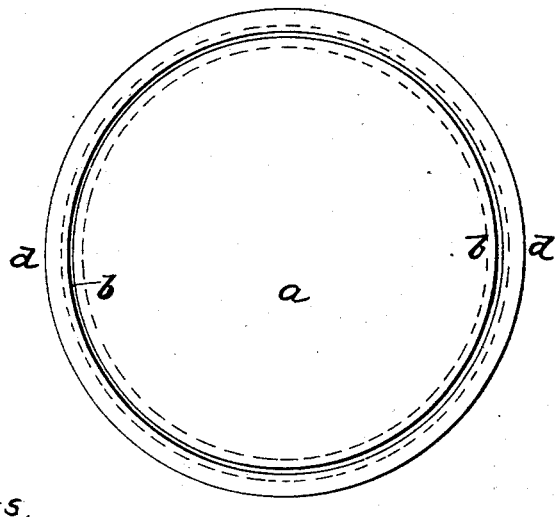

Figure 1, is a vertical section and Fig. 2, is a plan of my kettle as ready for use.

The like marks of reference denote the same parts in both figures.

In all other kettles for calcining plaster, with which I am acquainted, the bottom is formed of flat plates or sections supported by brick piers, between which piers the heat passes, and the plaster is confined while being thus heated in a circular kettle and is agitated by rotary stirrers until calcined as usual. In these kettles it is often found that the plates warp and crack, letting the plaster down into the fire, or else taking the scrapers and breaking the same, besides which the brick piers supporting the bottom prevent the fire operating uniformly on the plaster, and also burn out, consequently they are a constant source of expense and loss. To avoid these difficulties I have constructed a cast iron (or other metal) bottom $a$, of a slightly conical form and provided the same with a flat bearing ($b$,) near the edge thereof, setting on the annular ring or support ($c$) built into the mason work and receiving the sides ($d$), of the kettle. These sides may be made in any convenient manner and provided with a flue $e$, encircling the same or the heat may pass up all around the kettle, the ring $c$, being supported on piers.

$f$, represents the furnace to heat the kettle. And the kettle is to be provided with a gate to draw out the plaster as usual. Instead of having the bottom conical it may be a flat arch, but the conical form is preferable as the scrapers can be fitted more easily. And the joint around the bottom should be luted with fire clay or mortar.

It will be now evident that as the bottom becomes heated it will expand, hence I allow sufficient space for that purpose within the ring $c$, and the tendency of heat is to expand the middle more than the sides, therefore the conical form instead of giving down under the heat and weight of material rises, affording more strength from the form, as the material is weakened by the heat, consequently I find that bottoms of a conical or arched form will support several tons of plaster even though nine or ten feet diameter, and heated sufficiently for calcining.

If the bottom and sides were made in one piece or connected together permanently, the one or the other would be sure to crack, because in charging the same, some parts are exposed to heat while others are suddenly cooled, therefore the bottom must be allowed to contract and expand separately.

From the foregoing it will be evident that I do not claim a conical or arched bottom kettle in itself, because I am well aware that many various kinds of kettles have been thus formed and connected to the sides, but I am not aware of any other kettle for calcining plaster having heretofore been made with a separate conical or arched bottom supported in bearings around its edge that will permit of a sliding motion as the bottom expands and contracts.

Therefore what I desire to secure by Letters Patent is,

I claim the method herein described and shown of fitting a conical or arched bottom to kettles for calcining plaster, so that the same shall be allowed to slide on its bearings as it expands and contracts, for the purposes and as specified.

In witness whereof I have hereunto set my signature this twelfth day of September one thousand eight hundred and fifty-four.

J. B. KING.

Witnesses:
   LEMUEL W. SERRELL,
   THOMAS G. HAROLD.